United States Patent
Osakabe et al.

(10) Patent No.: US 8,208,180 B2
(45) Date of Patent: Jun. 26, 2012

(54) COVERING DEVICE, AND IMAGE READING APPARATUS EQUIPPED WITH THE COVERING DEVICE

(75) Inventors: Yoshinori Osakabe, Seto (JP); Takayuki Akimatsu, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 529 days.

(21) Appl. No.: 12/504,386

(22) Filed: Jul. 16, 2009

(65) Prior Publication Data

US 2010/0014127 A1    Jan. 21, 2010

(30) Foreign Application Priority Data

Jul. 18, 2008   (JP) ................................. 2008-187612

(51) Int. Cl.
*H04N 1/04* (2006.01)
(52) U.S. Cl. ......... 358/474; 358/400; 358/471; 358/497
(58) Field of Classification Search .................. 358/474, 358/400, 471, 497, 498
See application file for complete search history.

(56) References Cited

U.S. PATENT DOCUMENTS

| | | | |
|---|---|---|---|
| 5,110,103 A | 5/1992 | Miyoshi et al. | |
| 5,355,195 A | 10/1994 | Miyamoto et al. | |
| 7,225,506 B2 * | 6/2007 | Tiao | 16/374 |
| 8,018,628 B2 * | 9/2011 | Kurokawa et al. | 358/471 |
| 2003/0049061 A1 * | 3/2003 | Hata et al. | 399/367 |
| 2007/0201109 A1 | 8/2007 | Osakabe et al. | |
| 2007/0201111 A1 | 8/2007 | Osakabe et al. | |

FOREIGN PATENT DOCUMENTS

| | | |
|---|---|---|
| JP | S55-100540 A | 7/1980 |
| JP | S63-064057 A | 3/1988 |
| JP | H06-148961 A | 5/1994 |
| JP | H07-015571 A | 1/1995 |
| JP | H09-065029 A | 3/1997 |
| JP | H09-189972 A | 7/1997 |
| JP | H09-261422 A | 10/1997 |
| JP | H10-304129 A | 11/1998 |
| JP | 2001-203838 A | 7/2001 |
| JP | 2003-149754 A | 5/2003 |
| JP | 2003-172977 A | 6/2003 |
| JP | 2005-269450 A | 9/2005 |
| JP | 2008-102439 A | 5/2008 |

OTHER PUBLICATIONS

Japan Patent Office; Notification of Reason for Rejection in Japanese Patent Application No. 2008-187612 (counterpart to the above-captioned US Patent Application) mailed on Jun. 2, 2010.

\* cited by examiner

*Primary Examiner* — Houshang Safaipour
(74) *Attorney, Agent, or Firm* — Baker Botts L.L.P.

(57) ABSTRACT

A covering device which includes a cover member that selectively covers a body, a first hinge mechanism, and a second hinge mechanism. The first hinge mechanism includes a first movable member that is pivotally coupled to the cover member and slidably attached to the body. The first movable member is configured to move relative to the body in a predetermined direction. The first hinge mechanism further includes a brake member which generates a brake force that applies resistance against the first movable member when a force is applied to move the first movable member relative to the body in the predetermined direction. The first hinge mechanism is positioned further from a center of gravity of the cover member than the second hinge mechanism.

11 Claims, 15 Drawing Sheets

COVERING DEVICE, AND IMAGE READING APPARATUS EQUIPPED WITH THE COVERING DEVICE

CROSS REFERENCE TO RELATED APPLICATION

The present application claims priority from Japanese Patent Application No. 2008-187612, which was filed on Jul. 18, 2008, the disclosure of which is incorporated herein by reference in its entirety.

BACKGROUND OF THE INVENTION

1. Field of the Invention

The invention relates to a covering device with a cover member which selectively opens and closes by means of a pair of hinge units, and to an image reading apparatus equipped with the covering device and an image recording apparatus equipped with the image reading apparatus.

2. Description of the Related Art

Image reading apparatus provided in copying machines are known. A known image reading apparatus is provided with a cover member which is configured to cover and press a document placed on a reading glass plate. The cover member is attached to one side of a lower casing of the image reading apparatus by a pair of hinge units. The known image reading apparatus reads an image of the document placed on the reading glass plate. The known image reading apparatus also reads images in a book, such as a bulky book. When reading images in a bulky book with the image reading apparatus, the cover member for covering the book document is moved orthogonally, e.g., vertically, to the wide surface, e.g., a horizontal surface, of the reading glass plate by means of a pair of hinge units. The known image reading apparatus has been proposed in Japanese Unexamined Patent Application Publication Nos. 2007-228528 and 2007-228529. The lower casing is attached to an upper surface of a housing accommodating an image recording unit in a multifunction apparatus or the like.

Specifically, as disclosed in a known image reading apparatus, e.g., the apparatus disclosed in Japanese Unexamined Patent Application Publication Nos. 2007-228528 and 2007-228529, and, as shown in FIGS. 19A and 19B, a reading glass plate is attached to an upper surface of a lower casing 101 of an image reading apparatus. The image reading apparatus is mounted on top of a housing 100 of a multifunction apparatus or the like. A linear image reading unit (not shown) is disposed below the reading glass plate. A partial casing 103 protrudes upwardly from the upper surface of a cover member 102 and covers the entire upper surface of lower casing 101. An auto document feeder for feeding a document is built into partial casing 103. In addition, a document tray unit 104 is provided. Document tray unit 104 slopes downwardly toward partial casing 103. Further, documents stacked on the document tray unit 104 are conveyed and separated one from another by the auto document feeder. Documents are then scanned by the image reading unit and discharged to a discharge tray unit 105 disposed on the upper surface of cover member 102 below document tray unit 104. An image of the document placed on the reading glass plate is read by the image reading unit moving along the lower surface of the reading glass plate.

Furthermore, in order to read an image in a bulky book while pressing the bulky book with cover member 102, a pair of hinge units 106 and 107 are provided on the rear side of lower casing 101. Cover member 102 is attached to the casing by hinge units 106 and 107 in such a manner that cover member 102 is vertically movable relative to the upper surface of the reading glass plate.

As shown in FIG. 19A, the pair of hinge units 106 and 107 are arranged such that a first hinge unit 106 is positioned further away from partial casing 103 than a second hinge unit 107. Bearing portions provided at the upper end of a hinge block member 106a of first hinge unit 106 and a hinge block member 107a of second hinge unit 107 are coupled to one side of cover member 102 through horizontal rotating shafts, respectively. The elongated hinge block members 106a and 107a are accommodated in storage units 106b and 107b in lower casing 101 in a vertically-movable, e.g., slidable, manner.

In a known image reading apparatus, e.g., the image reading apparatus disclosed in Japanese Unexamined Patent Application Publication Nos. 2007-228528 and 2007-228529, however, a problem occurs when cover member 102 pivotally opens to expose the reading glass plate for setting the document thereon. More specifically, upper partial casing 103 of cover member 102 incorporates various mechanical parts, such as, a pickup roller, a feed roller, and a guide member for conveying the document constituting the auto document feeder. In FIGS. 19A and 19B, the center of gravity Go of the weight W of cover member 102 is positioned on the left side, i.e., closer to second hinge unit 107 than first hinge unit 106.

A horizontal groove-like recess portion 108 is formed on another side of cover member 102, e.g., opposite to the side where the pair of hinge units 106 and 107 are disposed. When an operator puts his/her fingers into recess portion 108 to open cover member 102, first hinge unit 106, which is further from the center of gravity Go, has a load lower than a load of second hinge unit 107, which is closer to the center of gravity Go. Thus, as shown in FIG. 19B, hinge block member 106a moves upward and off storage unit 106b to raise the right side of cover member 102 before the left side of cover member 102 is lifted up. As a result, displacement occurs between right hinge unit 106 and left hinge unit 107. The displacement causes cover member 102 to not pivotally open in a smooth manner.

SUMMARY OF THE INVENTION

Therefore, an object of the invention is to provide a covering device for pivotally opening and closing a cover member in a smooth manner regardless of the thickness of a document. Another object of the invention is to provide an image reading apparatus equipped with the covering device and an image recording apparatus equipped with the image reading apparatus.

According to an embodiment of the invention, a covering device comprises a body, a cover member configured to selectively cover at least a portion of the body, a first hinge mechanism and a second hinge mechanism. The first hinge mechanism comprises a first movable member and a brake member. The first movable member is pivotally coupled to the cover member and slidably attached to the body, and the first movable member is configured to move relative to the body in a predetermined direction. The brake member is configured to generate a brake force that applies resistance against the first movable member when a force is applied to move the first movable member relative to the body in the predetermined direction. The second hinge mechanism comprises a second movable member, wherein the second movable member is pivotally coupled to the cover member and slidably attached to the body, and the second movable member is configured to move relative to the body in the predetermined direction. The first hinge mechanism is positioned further from a center of gravity of the cover member than the second hinge mechanism, and the brake force generated by the brake member of the first hinge mechanism is greater than a frictional force generated by the second hinge mechanism when a force is applied to move the second movable member relative to the body in the predetermined direction.

Other objects, features, and advantages will be apparent to persons of ordinary skill in the art from the following detailed description of the invention and the accompanying drawings.

BRIEF DESCRIPTION OF THE DRAWINGS

For a more complete understanding of the invention, the needs satisfied thereby, and the features and technical advantages thereof, reference now is made to the following descriptions taken in connection with the accompanying drawings.

DESCRIPTION OF THE PREFERRED EMBODIMENTS

Embodiments of the invention and their features and technical advantages may be understood by referring to FIGS. 1-19B, like numerals being used for like corresponding parts in the various drawings.

Figure 1:
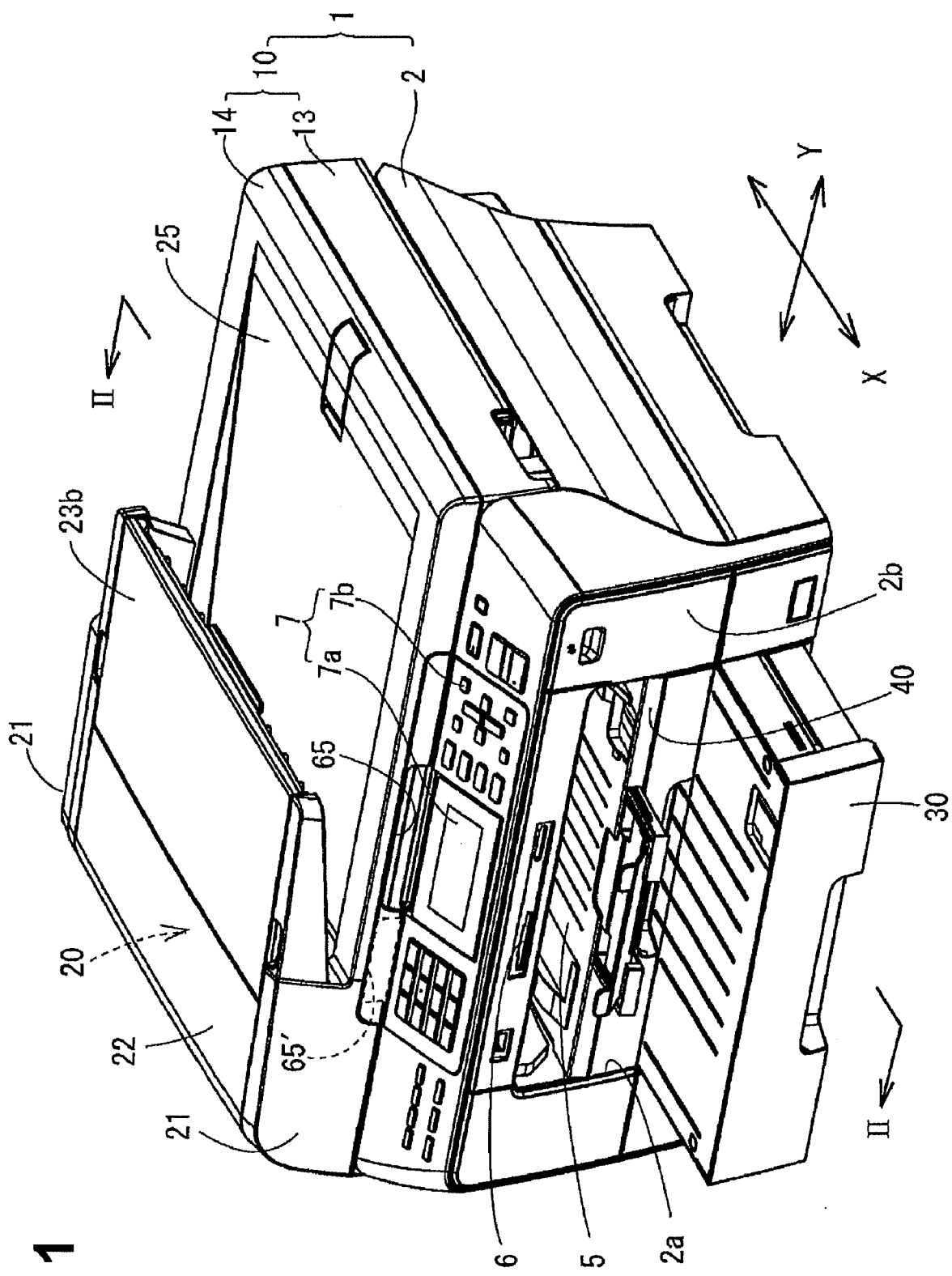
FIG. 1 is a perspective view of an image recording device, e.g., multi-function device, according to an embodiment of the invention.

Referring to FIG. 1, a multifunction apparatus 1 may comprise an image reading apparatus 10. Multifunction apparatus 1 may be a multifunction peripheral configured to perform one or more of a facsimile function, a scanner function, a copier function, and a printer function. Multifunction apparatus 1 may be connected to a computer or a communication network and may record an image or a text on a recording medium, e.g., a recording sheet or a resin sheet, based on image data or text data received from the computer or the communication network.

Figure 2:
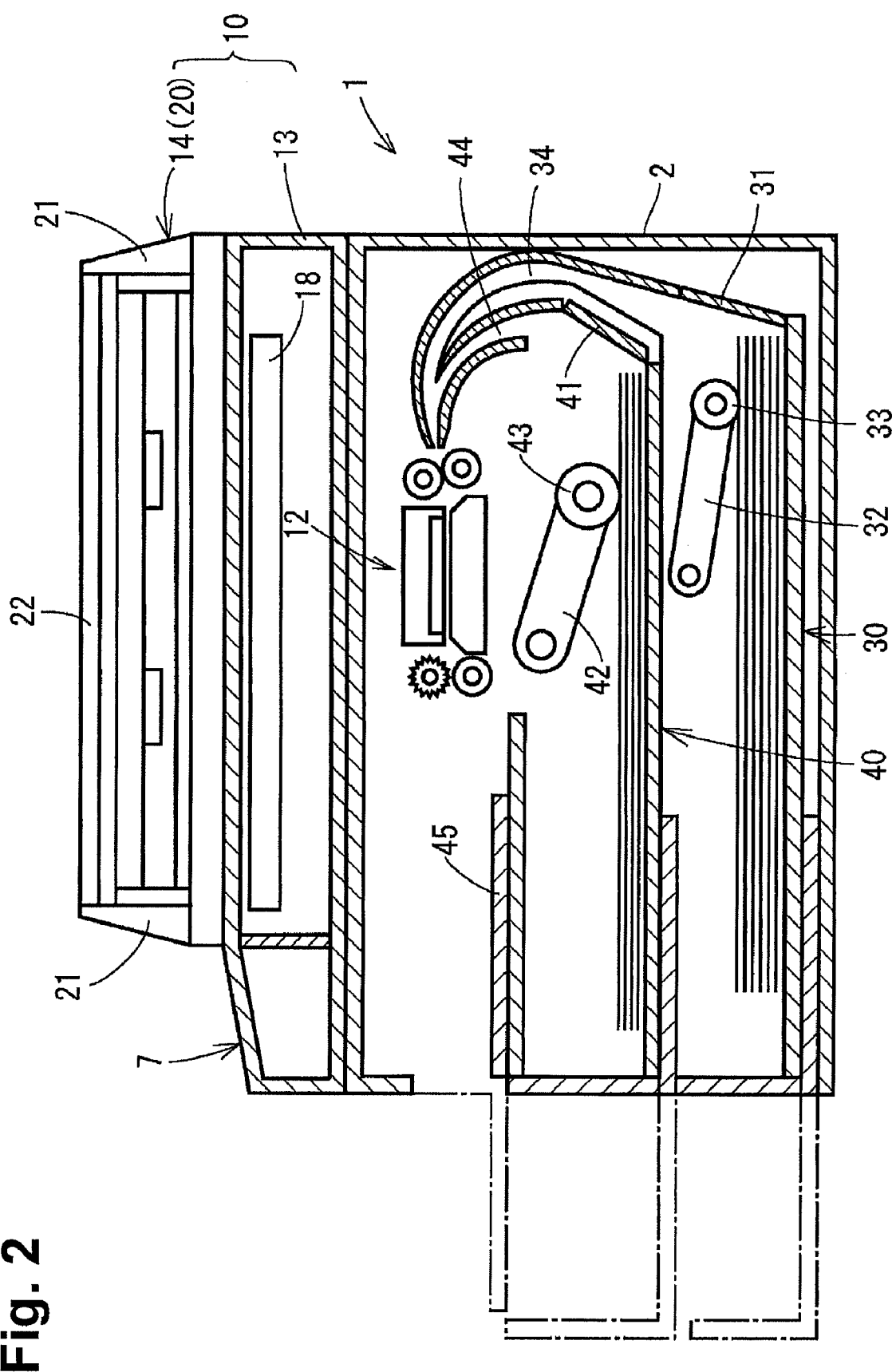
FIG. 2 is a cross sectional view taken along line II-II in FIG. 1.

Referring to FIGS. 1 and 2, a lower first feeding cassette 30 and an upper second feeding cassette 40 may be removably inserted through an insertion opening 2a on the front side of a housing 2 into a cassette storage unit, e.g., storage space, at the bottom of a synthetic resin main casing, e.g., a housing 2. An image recording unit 12, e.g., an inkjet recording unit, may be disposed above second feeding cassette 40. First feeding cassette 30 may comprise a storage portion in which a plurality of sheets, e.g., 250 pieces of A3-sized sheets, may be stacked such that the short side of the sheets is substantially parallel to a main scanning direction, e.g., the Y direction in FIG. 1. A sheet holding capacity of second feeding cassette 40 may be smaller than that of first feeding cassette 30. Hereinafter, the side of synthetic resin housing 2 including the insertion opening 2a is referred to as a "front side", and the front side, the left side, the right side, and the rear side of the apparatus are referred to based on their respective orientations relative to the front side. A slot portion 6 may be disposed at the front side of housing 2. Various types of storage media, e.g., memory cards, may be inserted into slot portion 6 for reading image data, or the like, stored in the storage medium, and for recording the image data, or the like, onto a recording sheet.

An operation panel unit 7 may be disposed on the upper front side of housing 2 in front of an image reading apparatus 10. Operation panel unit 7 may comprise a liquid crystal display 7a and various operation buttons 7b. An ink cartridge carrying device (not shown) may be accommodated on the front side of housing 2 on the right side of insertion opening 2a. The ink carrying device may be covered with a cover 2b. A hinge may be disposed at the lower end of cover 2b, and cover 2b may rotate toward the front side of housing 2 by means of the hinge.

Referring to FIG. 2, an upper inclined separator 41 may be disposed on the back side of second feeding cassette 40, e.g., the downstream end of conveying direction and the right side in FIG. 2. An upper feeding roller 43 may be rotatably supported at one end of an upper feeding arm 42. Upper feeding roller 43 may be disposed above the back portion of the bottom surface of second feeding cassette 40. Upper feeding arm 42 may be biased downward to bring upper feeding roller 43 into contact with the top-most sheet of stacked sheets stored in second feeding cassette 40. A driving source may transmit a driving force to rotate upper feeding roller 43. Upper feeding roller 43 may cooperate with upper inclined separator 41 to separate the stacked sheets one from another and to guide the sheets upward.

An upper sheet transport path 44 may extend upward from upper inclined separator 41 and then may form a U-shaped turn toward the front side of multifunction apparatus 1. A sheet P may be conveyed to image recording unit 12. After image recording operation in image recording unit 12, sheet P may be discharged onto a discharge tray unit 45. Discharge tray unit 45 may cover the upper surface of second feeding cassette 40. Upper feeding arm 42 may be configured to move vertically when second feeding cassette 40 is being inserted or removed from housing 2. Consequently, when second feeding cassette 40 is being inserted or removed from housing 2, upper feeding roller 43 may not contact upper inclined separator 41.

First feeding cassette 30 may have substantially similar structure as second feeding cassette 40. A lower inclined separator 31 may be disposed at the back side of first feeding cassette 30, e.g., on the right side in FIG. 2. A lower feeding roller 33 may be rotatably supported at one end of a lower feeding arm 32. Lower feeding roller 33 may be disposed above the back portion of the bottom surface of first feeding cassette 30. Lower feeding arm 32 may be biased downward to bring lower feeding roller 33 into contact with the top-most sheet of stacked sheets P store in first feeding cassette 30. A driving source may transmit a driving force to rotate lower feeding roller 33. Lower feeding roller 33 may cooperate with lower inclined separator 31 to separate the stacked sheets one from another and to guide the sheets upward.

A lower sheet transport path 34 may be disposed outside of upper sheet transport path 44. Lower sheet transport path 34 may extend upward from lower inclined separator 31 and may form a U-shaped turn toward the front side of multifunction apparatus 1. An arc of the U-shaped turn of lower sheet transport path 34 may be larger than that of upper sheet transport path 44. A sheet may be conveyed through lower sheet transport path 34 and image recording may be performed on the sheet in image recording unit 12. The sheet may then be discharged onto discharge tray unit 45. Lower feeding arm 32 may be configured to move vertically when first feeding cassette 30 is being inserted or removed from housing 2. Therefore, lower feeding roller 33 may not contact lower inclined separator 31 when first feeding cassette 30 is being inserted or removed from housing 2. Sheets conveyed from both first feeding cassette 30 and second feeding cassette 40 may be discharged and stacked on discharge tray unit 45.

Figure 5:
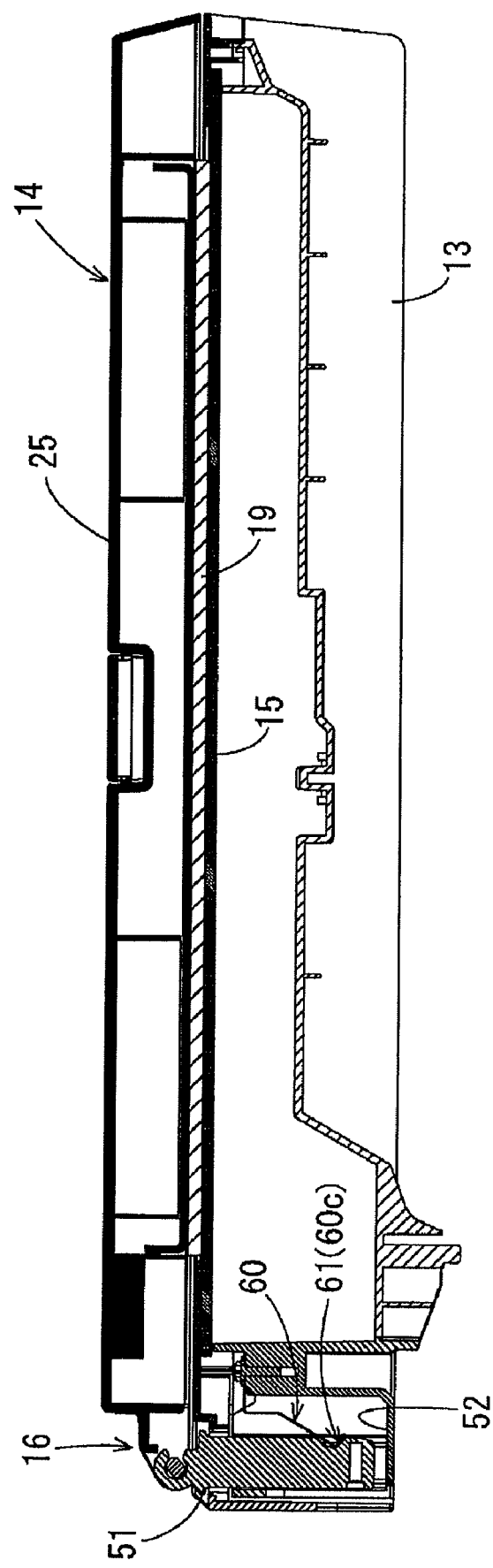
FIG. 5 is a cross sectional view taken along line V-V in FIG. 3.
Figure 6A:
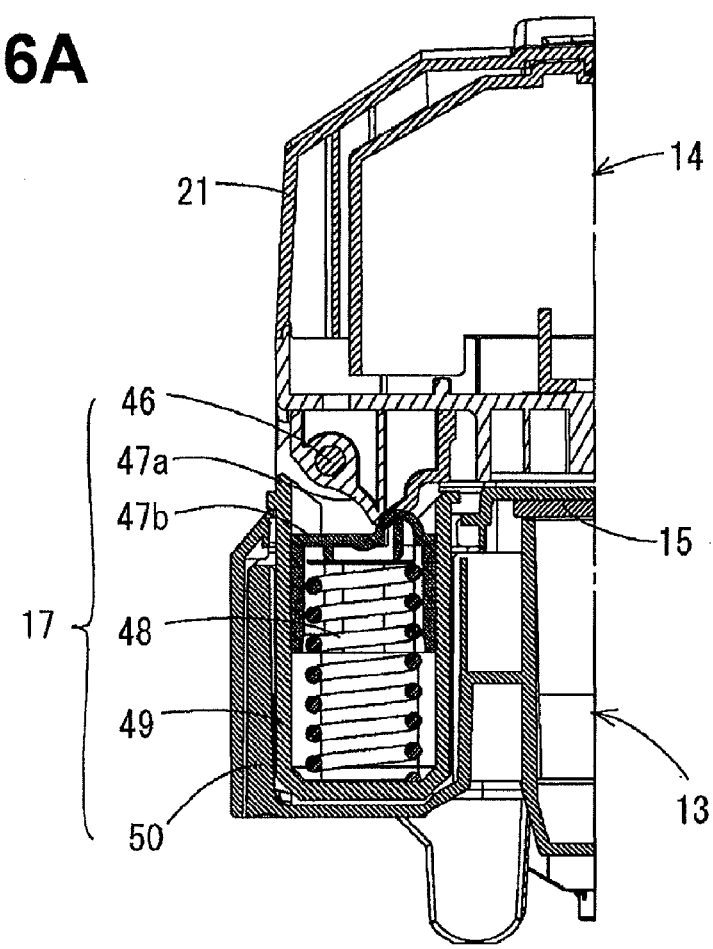
FIG. 6A is an enlarged cross sectional view of a second hinge unit taken along line VIA-VIA in FIG. 3.
Figure 6B:
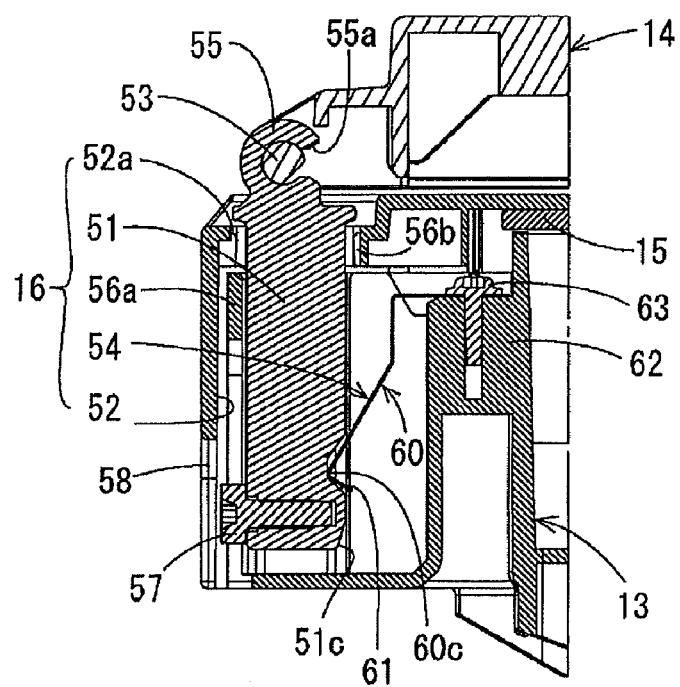
FIG. 6B is an enlarged cross sectional view of a first hinge unit taken along the line VIB-VIB in FIG. 3.

Image reading apparatus 10 may perform one or more of the copier function, the facsimile function, and the scanner function. Referring to FIG. 5, image reading apparatus 10 may comprise a lower casing 13, a glass plate 15 for reading a document disposed on top of lower casing 13, and a cover member 14 for covering glass plate 15. Lower casing 13 and cover member 14 may comprise a synthetic resin. Referring to FIGS. 5, 6A and 6B, cover member 14 may be pivotally attached to lower casing through a pair of hinge units 16 and 17 disposed at the rear end lower casing 13. An image reading unit 18, e.g., a contact image sensor or a charge-coupled device, configured to read a document may be disposed below glass plate 15. Glass plate 15 may be a light transmissive plate. Image reading unit 18 may move in a direction parallel to the surface of glass plate 15, e.g., in the Y direction in FIG. 1. Image reading unit 18 may comprise a linear image sensor which may emit light from a light source toward the document through glass plate 15. The linear image sensor may condense light reflected by the document onto a lens or a light receiving device to convert the received light into an electric signal. Image reading unit 18 may reciprocate in the Y direction in FIG. 3 along a guide shaft by means of a moving mechanism. When reading an image of the document with an auto document feeder 20, image reading unit 18 may be set at a reading position below auto document feeder 20. A holding member 19 may be disposed on cover member 14. Holding member 19 may comprise a sponge or a whiteboard configured to contact glass plate 15.

Figure 3:
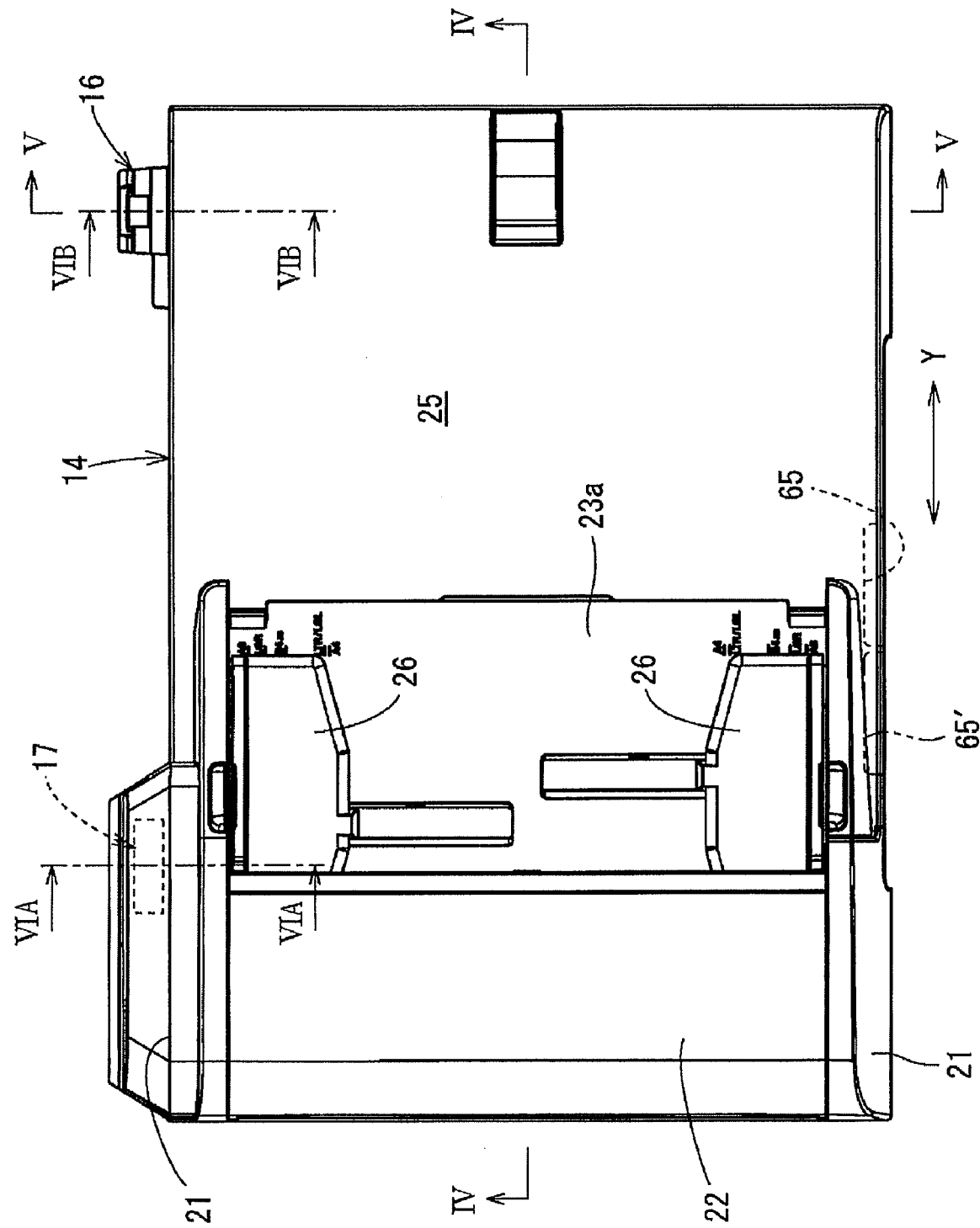
FIG. 3 is a plan view of a cover member, according to an embodiment of the invention.

Referring to FIGS. 1 and 3, a cover 22 configured to selectively cover the top of auto document feeder ("ADF") 20 may be disposed between a pair of side covers 21, which may extend upward from cover member 14. Cover 22 may be pivotally attached to cover member 14 at a hinge near the left ends of the pair of side covers 21.

Figure 4:
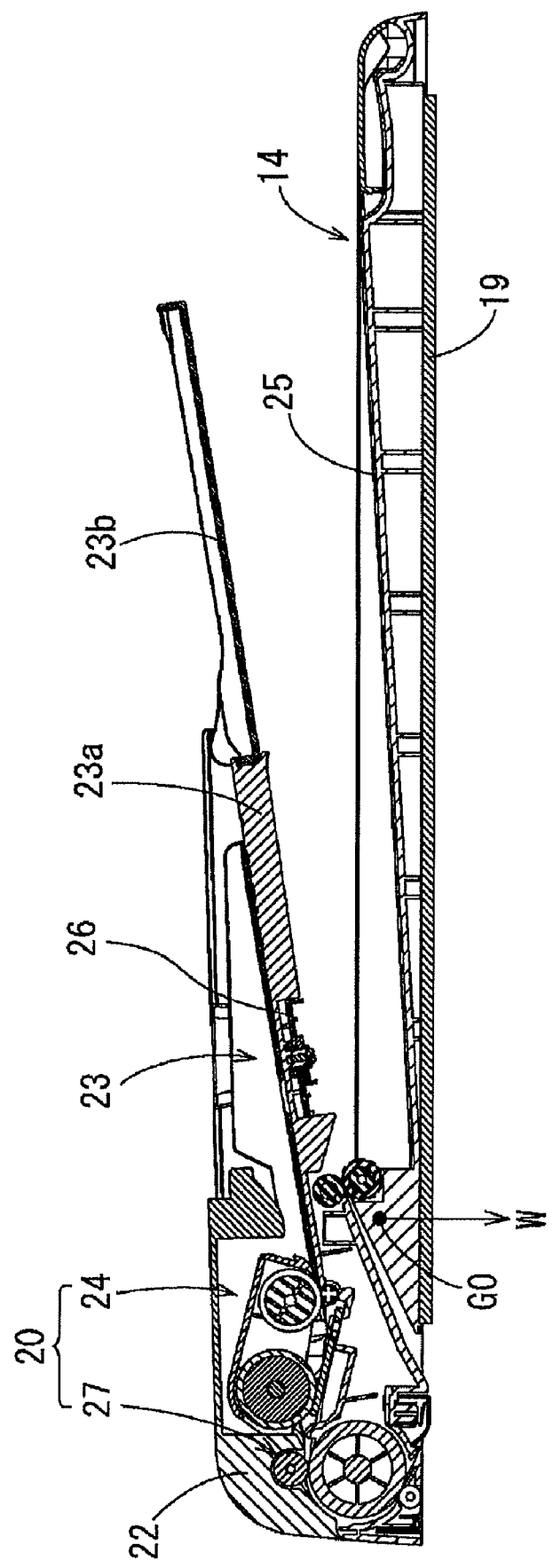
FIG. 4 is a cross sectional view taken along line IV-IV in FIG. 3.

Referring to FIG. 4, auto document feeder 20 may comprise a separating and conveying mechanism 24 configured to separate and convey documents stacked on a feeding unit 23 one at a time. Auto document feeder 20 also may comprise a conveying unit 27, which may comprise a plurality of rollers for discharging the scanned documents onto a discharge tray 25. Feeding unit 23 may comprise a feeding tray 23a, which may comprise a pair of side guides 26 disposed on its upper surface, and a document holder 23b. A document transport path may be formed in a U-shape to convey the document from separating and conveying mechanism 24 to a reading position and further to discharge tray 25. Discharge tray 25 may be integrally formed on cover member 14. Feeding unit 23 may be disposed above discharge tray 25 and may slope downward toward separating and conveying mechanism 24. Document holder 23b may fold upward toward the upper surface of feeding tray 23a.

Referring to FIG. 3, second hinge unit 17 may be disposed at one end of lower casing 13 closer to auto document feeder 20. The center of gravity of cover member 14 may be positioned closer to second hinge unit 17. The center of gravity Go of weight W of cover member 14 may be positioned at the left side in FIG. 4. Second hinge unit 17 may be disposed closer to the center of gravity Go than first hinge unit 16.

Referring to FIG. 6A, second hinge unit 17 may comprise a first cam member 47a attached to the lower surface of cover member 14, a horizontal shaft 46 passing through first cam member 47a, a box-like supporting block member 49, a spring member 48 accommodated in supporting block member 49, and a second cam member 47b. Block member 39 may have an open top configured to couple to horizontal shaft 46 passing through a pair of side walls. Spring member 48 may be accommodated in supporting block member 49. Second cam member 47b may be configured to contact first cam member 47a and may be accommodated in supporting block member 49 to cover spring member 48. Second cam member 47b may move vertically by the expansion and the contraction of spring member 48. First cam member 47a, second cam member 47b, and supporting block member 49 may comprise a synthetic resin, e.g., POM: polyacetal. Spring member 48 may be a metal spring. A storage unit 50 may accommodate supporting block member 49 such that supporting block member 49 may move in the vertical direction. Storage unit 50 may be integrated with lower casing 13. Cover member 14 may pivot about horizontal shaft 46 to selectively cover lower casing 13. Auto document feeder 20 may be elastically supported by first cam member 47a, second cam member 47b, and spring member 48. When a bulky book is placed on glass plate 15 and cover member 14 covers the front cover of the book, supporting block member 49 may be raised upward and away from the inner portion of storage unit 50. Cover member 14 may move upward and away from the surface of glass plate 15. First cam member 47a, second cam member 47b, and supporting block member 49 may comprise a synthetic resin or a material having similar properties.

Referring to FIGS. 5, 6B, 7A, and 7B, hinge unit 16 may comprise a block member 51, a storage unit 52, and a brake unit 54. Block member 51 may be a vertically elongated block. Block member 51 may attach to cover member 14 through a horizontal shaft 53. Storage unit 52 may be integrated with lower casing 13 and may be configured to receive block member 51 such that block member 51 may move in the vertical direction. Brake unit 54 may be disposed in storage unit 52 and configured to generate a force of resistance to the upward movement of block member 51. A bearing portion 55 may be integrally formed at the upper end of synthetic resin block member 51. Bearing portion 44 may rotatably support horizontal shaft 53. Bearing portion 55 may have an opening portion 55a at one end. Horizontal shaft 53 may have an oval section form by cutting away the right and left potions of the round shaft. When horizontal shaft 53 is rotated to a certain position, the oval section of horizontal shaft 53 may fit through opening portion 55a to selectively separate from bearing portion 44. Horizontal shaft 53 may be attached to cover member 14.

Figure 8:
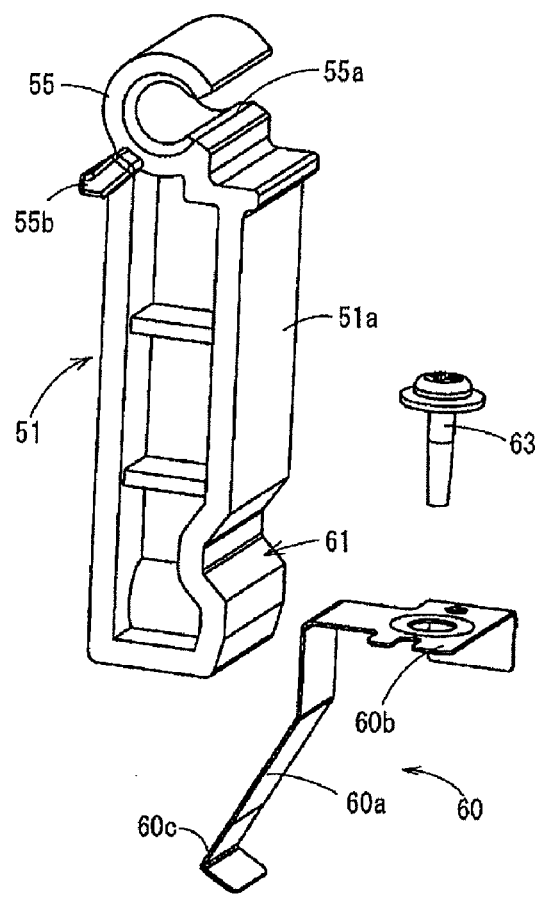
FIG. 8 is an exploded perspective view of components of a brake unit according to an embodiment of the invention.

Bearing portion 55 of block member 51 may protrude upward from an opening portion 52a formed at the upper end of storage unit 52. As shown in FIG. 8, a stopper 55b may be disposed at the lower portion of bearing portion 55. Stopper 55b may protrude in the horizontal direction. Stopper 55b may be configured to prevent bearing portion 55 from falling down through opening portion 52a. A pair of guides 56a and 56b may slidably contact and guide block member 51 in a substantially straight line and prevent block member 51 from rattling in storage unit 52. A stopper member 57, e.g., a screw, may be screwed to the lower end of block member 51. Stopper member 57 may contact the lower end of guide unit 56a to prevent block member 51 from slipping out of storage unit 52. A window 58 may be formed at the side surface of storage unit 52 to provide access for fixing stopper member 57 to block member 51 when block member 51 is positioned in storage unit 52.

Referring to FIGS. 5, 6B, 7A and 7B, brake unit 54 may comprise a leaf spring member 60 and a resistance portion 61. Resistance portion 61 may be disposed at a lower slope of a recess 64 formed in a lower portion of a side surface 51a of block member 51 opposite to the side surface where stopper member 57 is attached.

Leaf spring member 60 may comprise a main body portion 60a extending downward, a proximal end extending from one end of main body portion 60a, and a projection 60c which is bent into a laterally V-shape form at the lower end of main body portion 60a.

Figure 7A:
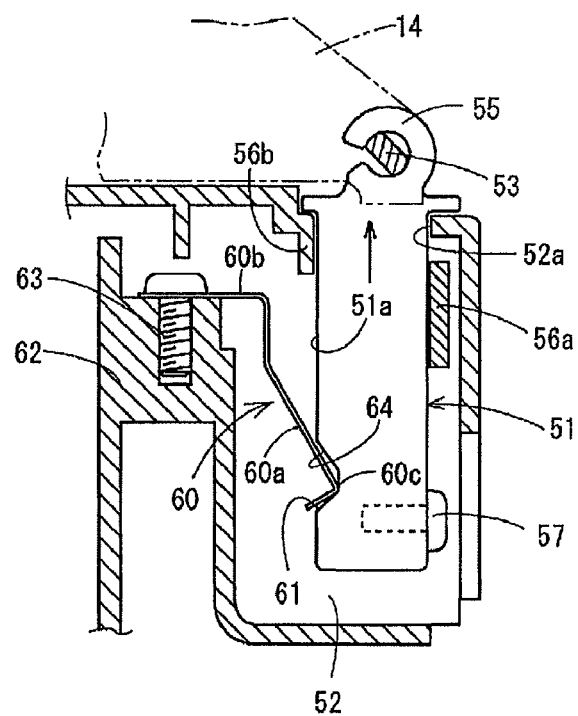
FIG. 7A is a cross sectional view depicting the beginning of upward movement of a block member from the lowest position, according to an embodiment of the invention.

Proximal end 60b of leaf spring member 60 may be attached to a fixture 62 in storage unit 52 by means of a screw 63 or the like. Projection 60c may be configured to contact with side surface 51a and resistance portion 61 of block member 51. In an embodiment of the invention, a lower slope of recess 64 formed in a lower portion of side surface 51a form resistance portion 61. As shown in FIG. 7A, when block member 51 is set in the lowermost position, projection 60c of leaf spring member 60 may be fitted into recess 64. When a force is applied to block member 51 to raise block member 51 from the lowermost position, projection 60c may contact resistance portion 61 to generate a brake force that applies resistance against the force that raises block member 51.

Figure 9:
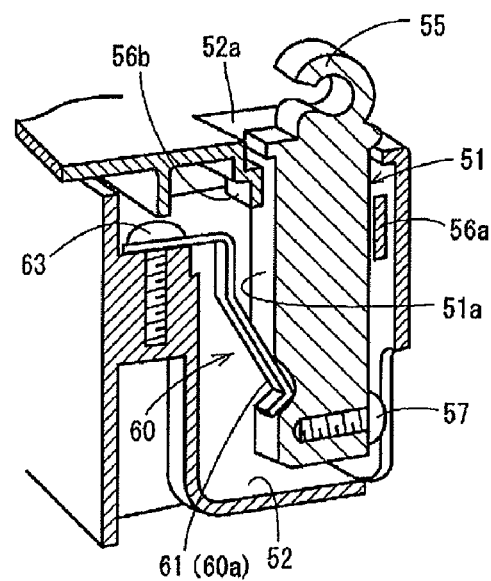
FIG. 9 is a partial-cutaway view depicting operations of the block member and the brake unit in FIG. 7A.

During a setup of imaging operation, an operator may insert a finger into a horizontal recess 65 formed on the front side of cover member 14 to pivot cover member 14 upwards. At this time, block member 51 of first hinge unit 16 may rise from the lowermost position in storage unit 52. Projection 60c of leaf spring member 60 may contact resistance portion 61 of block member 51 to prevent the upward movement of block member 51. Therefore, as shown in FIGS. 7A and 9, block member 51 may be retain at the lowermost position in storage unit 52. As a result, horizontal shaft 53 and horizontal shaft 46 of hinge units 16 and 17 may be maintained at the same height. As such, no torsion is induced in cover member 14, and cover member 14 may pivotally be opened in a smooth manner.

When opening cover member 14 to put a thick item, e.g., a book, on glass plate 15, an operator opens cover member 14, as described above. Subsequently, the operator closes cover member 14 to press the thick item with a pressure member 19. The side of cover member 14 having recess 65 formed therein may be rotated downward about the contact portion, between cover member 14 and the thick item. Consequently, the thick item may cause an upward tension to hinge units 16 and 17.

Figure 7B:
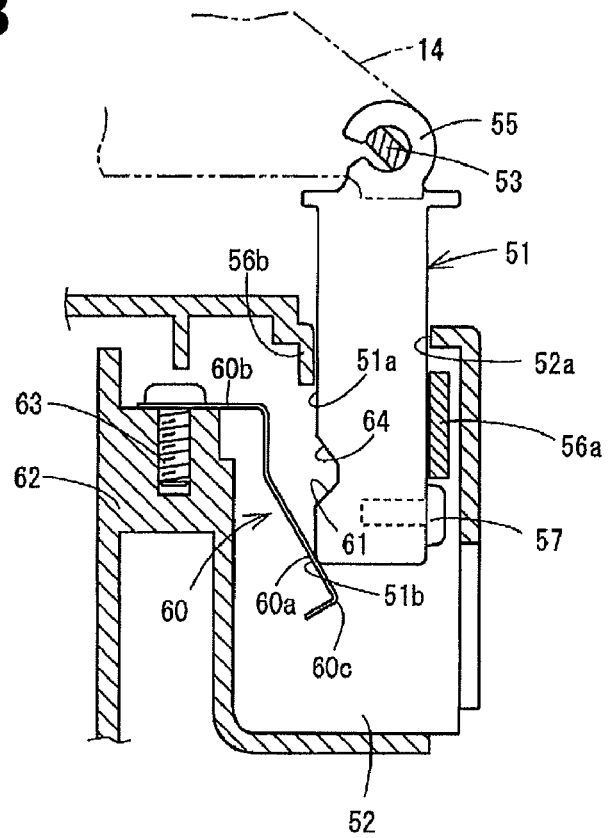
FIG. 7B is a cross sectional view depicting the block member of FIG. 7A moving upward and away from the lowest position.

The tension applied to hinge unit 16 may cause block member 51 to be pulled up. Resistance portion 61 may exert a braking force against projection 60c opposing the tension which is pulling up block member 51. Projection 60c may press back against an elastic force of leaf spring member 60 at resistance portion 61. When projection 60c reaches a position of side surface 51a that is lower than resistance portion 61, the braking force may dissipate to allow block member 51 to move upwards in a smooth manner. As shown in FIG. 7B, when projection 60c slides under the bottom of block member 51, the sloping main body portion 60a of leaf spring member 60 may support block member 51 at the lower corner. Thus, block member 51 may be lifted with ease until block member reaches a position at which stopper member 57 contacts the lower end of guide 56a.

Supporting block member 49 may be vertically movable relative to storage unit 50 as described above. Thereby, hinge units 16 and 17 easily may pivot cover member 14. After the thick item is removed from glass plate 15, a downward load may be applied to block member 51 in first hinge unit 16 due to the weight of cover member 14. Lower corner 51b of block member 51 may press the sloping main body portion 60a of leaf spring member 60 downward against its elastic force. When projection 60c of leaf spring member 60 comes into contact with side surface 51a of block member 51, the braking force may dissipate. Consequently, block member may move downward smoothly with little resistance until projection 60c is fitted into recess 64.

Figure 10:
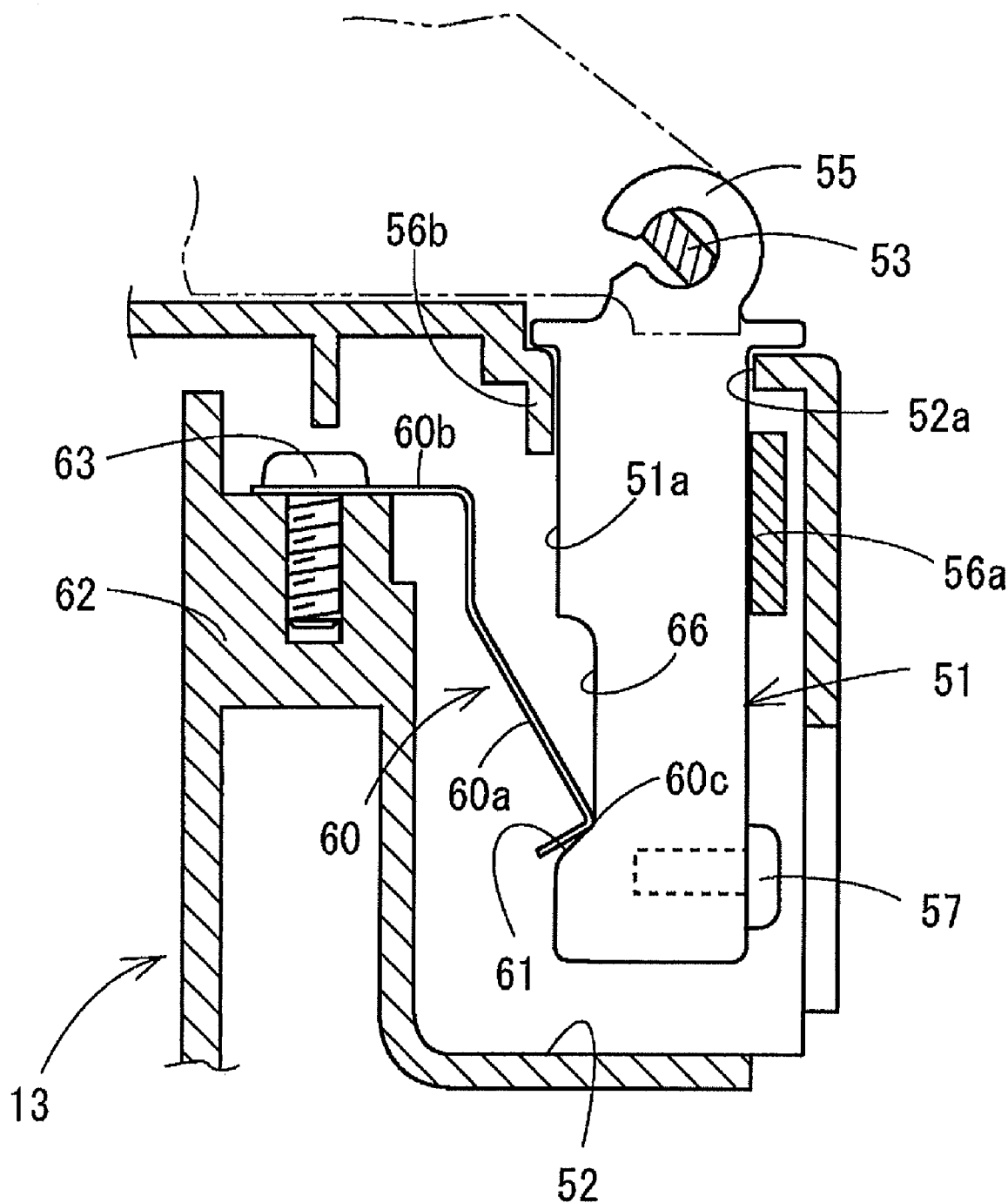
FIG. 10 is an enlarged cross sectional view of a brake unit according to another embodiment of the invention.

Referring to FIG. 10, according to a second embodiment of the invention, a recess 66 including resistance portion 61 may extend vertically at side surface 51a of block member 51 in first hinge unit 16. Recess 66 and resistance portion 61 may be disposed below an area where the pair of guides 56a and 56b slide along side surface 51a of block member 51 in the range of the vertical movement of block member 51.

Figure 11:
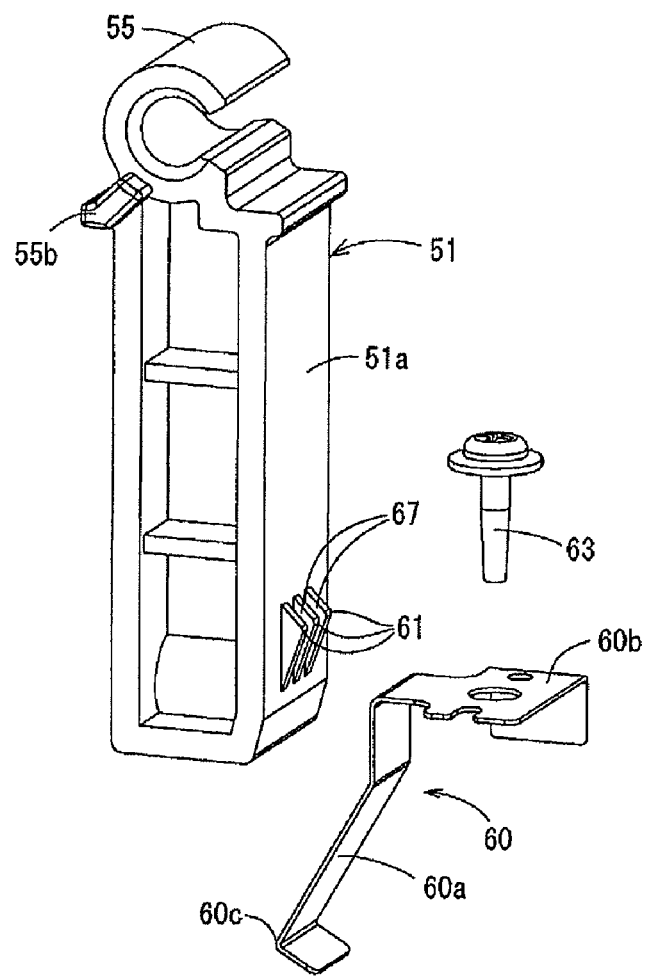
FIG. 11 is an exploded perspective view of components of a brake unit according to yet another embodiment of the invention.
Figure 12:
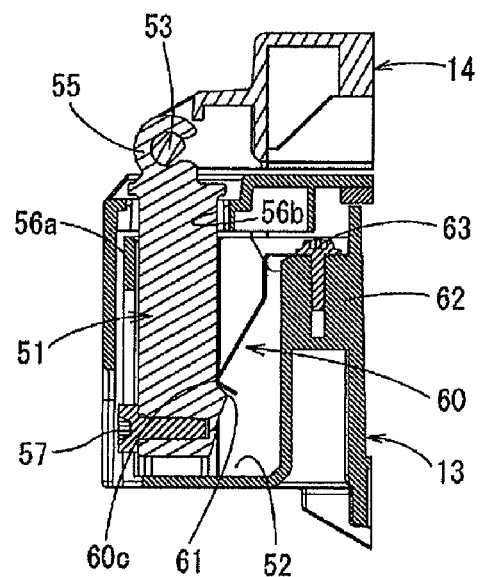
FIG. 12 is a cross sectional view of the brake unit according to the yet another embodiment of the invention.

Referring to FIGS. 11 and 12, according to a third embodiment of the invention, resistance portions 61 may be integrally formed near the lower end of flat side surface 51a of block member 51 in hinge unit 16. Grooves 67 may be formed between the three resistance portions 61 arranged in parallel to each other. Grooves 67 may reduce an area where resistance portions 61 slide against projection 60c of leaf spring member 60.

Figure 13:
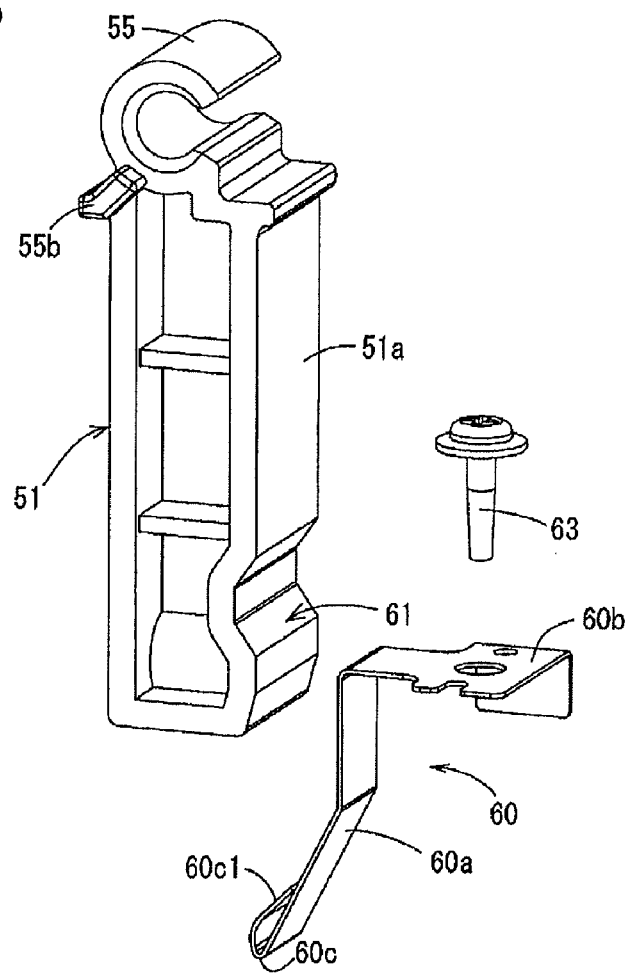
FIG. 13 is an exploded perspective view of components of a brake unit according to still another embodiment of the invention.
Figure 14:
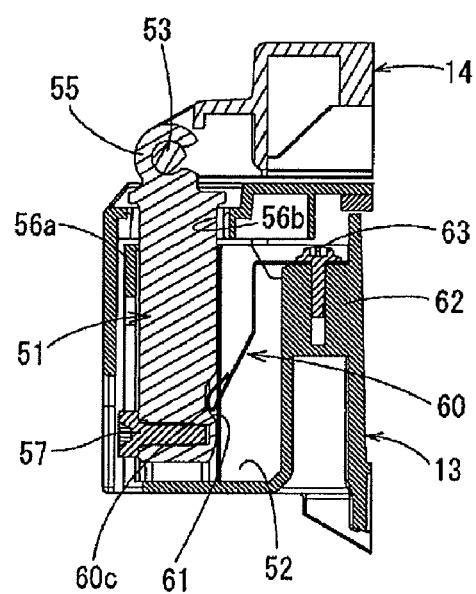
FIG. 14 is a cross sectional view of the brake unit according to the still another embodiment of the invention.

Referring to FIGS. 13 and 14, according to a fourth embodiment of the invention, a free end side 60c1 of projection 60c may be bent into a concave shape on the upper side of main body portion 60a.

Figure 15:
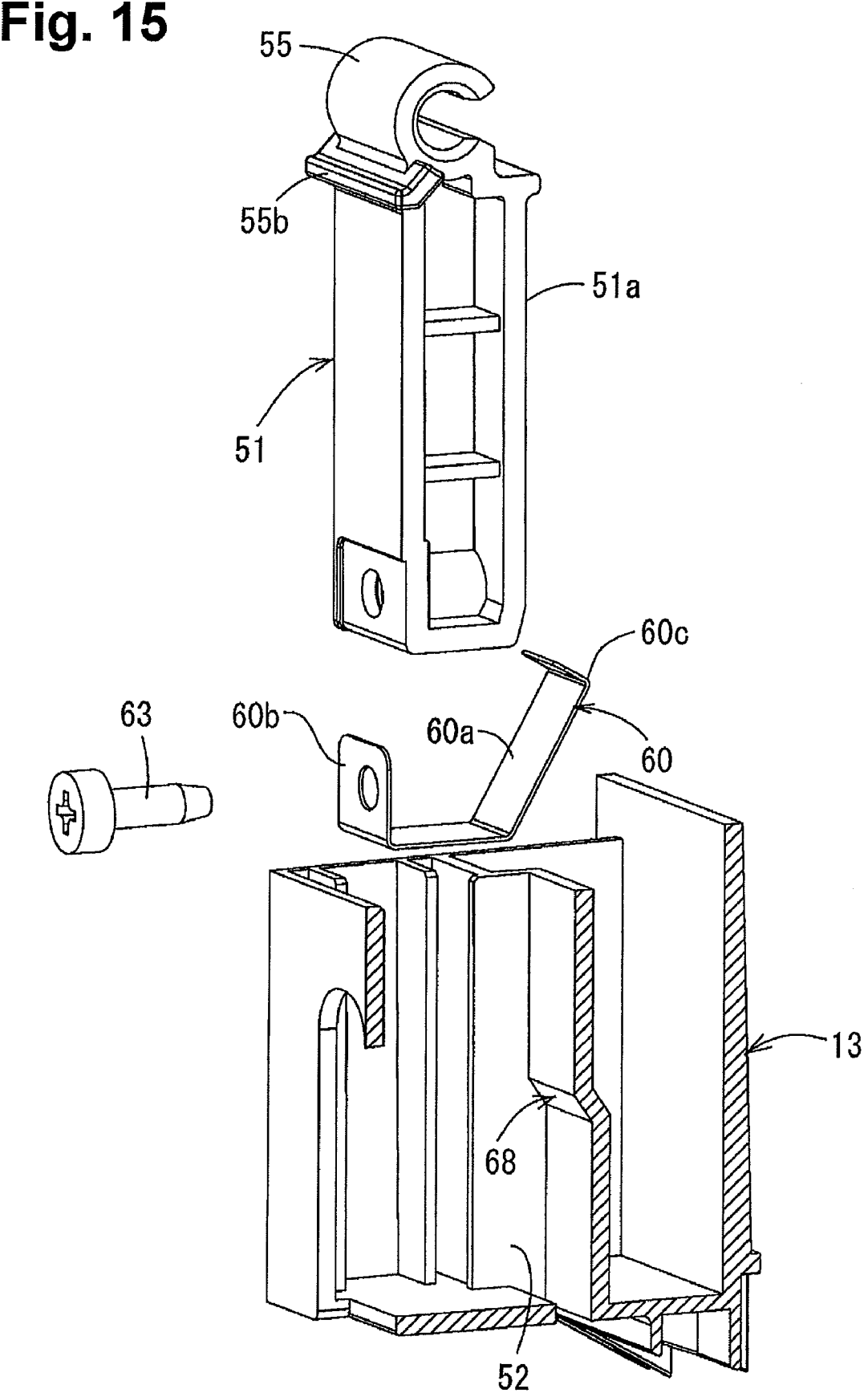
FIG. 15 is an exploded perspective view of components of a brake unit according to yet still another embodiment the invention.
Figure 16:
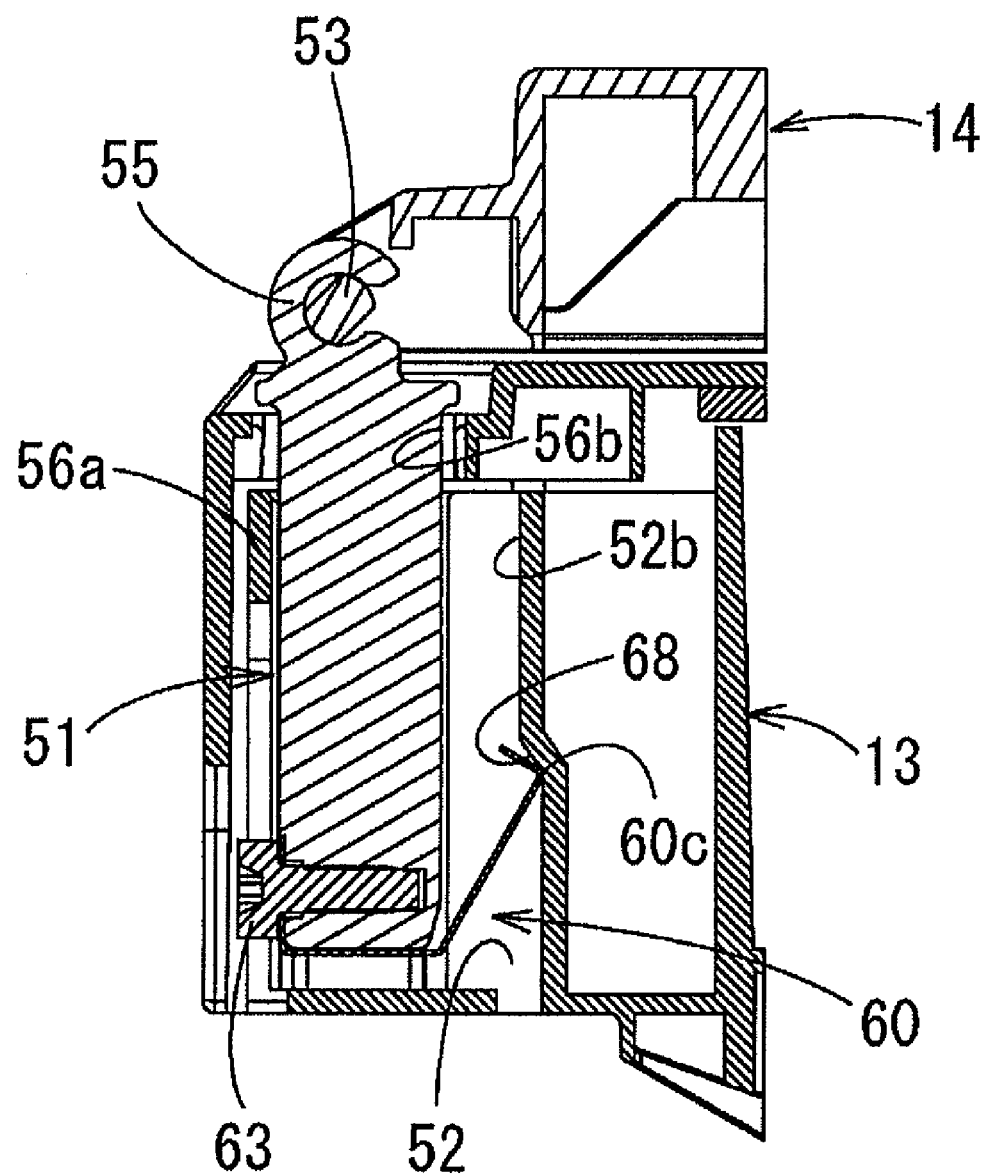
FIG. 16 is a cross sectional view of the brake unit according to the yet still another embodiment of the invention.

Referring to FIGS. 15 and 16, according to a fifth embodiment of the invention, proximal end 60b of leaf spring member 60 may be attached to block member 51 in hinge unit 16 by screw 63. Screw 63 also may perform a similar function as that of stopper member 57, as described with respect to the first embodiment. Projection 60c may have a substantially lateral V shape and may be integrally formed at the upper end of main body portion 60a. Main body portion 60a may have a substantially U shape continuous to proximal end 60b. On one side surface 52b of storage unit 52, e.g., side surface facing projection 60c, a resistance portion 68 may be formed. Resistance portion 68 may have a slope which slopes toward side surface 51a of block member 51 along the upward movement of block member 51.

Projection 60c of leaf spring member 60 may slide against resistance portion 68 at the beginning of the upward movement of block member 51 from the lowermost position to generate a resistance to the upward movement of block member 51. A portion of one side surface 52b, e.g., a portion that extends higher than resistance portion 68 in the vertical direction, may be a wall positioned closer to one side surface 51a of block member 51. Thus, the wall may continuously apply a predetermined amount of resistance to block member 51 when block member 51 is being raised by a large amount. Accordingly, block member 51 may move steadily and slowly in the area higher than resistance portion 68. Consequently, when cover member 14 is being closed after taking the thick item from glass plate 15, cover member 14 may lower slowly to reduce an impact on glass plate 15 and an impact noise may be reduced.

Figure 17:
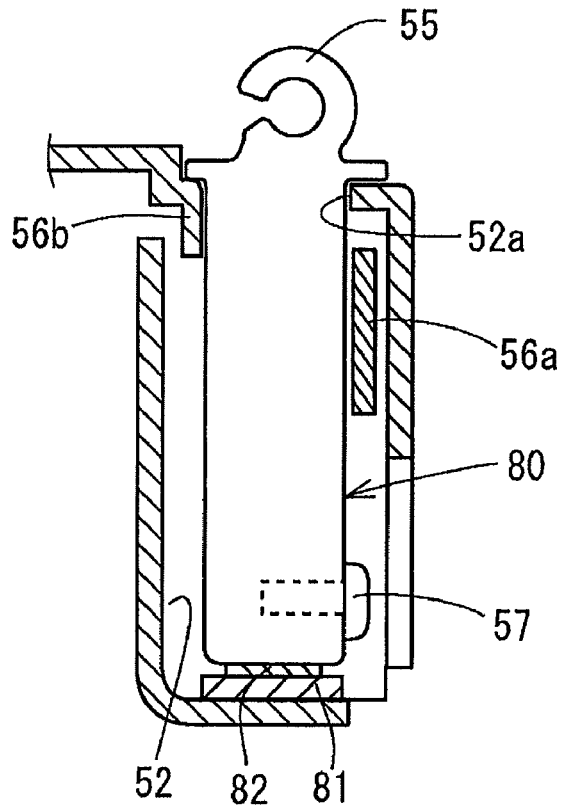
FIG. 17 is a cross sectional view of a brake unit according to another embodiment of the present invention.

Referring now to FIG. 17, according to a sixth embodiment of the invention, a magnet 81 and a metal portion 82 attractable to the magnet 81 may be provided in first hinge unit 16. Magnet 81 may be disposed in one of a block member 80 and storage unit 52. Metal portion 82 may be disposed in the other one of block member 80 and storage unit 52. When metal portion 82 is attached to the lower surface of block member 80 by means of an adhesive or the like, magnet 81 may be attached to the inside bottom of storage unit 52 facing metal portion 82. In another embodiment, magnet 81 may be attached to the lower surface of block member 80 and metal portion 82 may be attached to the inside bottom of the storage unit 52. Block member 80 may not comprise a convex resistance portion or a recess.

When block member 80 is at the lowermost position, a magnetic attractive force between magnet 81 and metal portion 82 may generate a braking force at the beginning of upward movement of block member 80 to brake the upward movement of block member 80. After the magnetic attractive force dissipates, block member 80 easily may move vertically. When block member 80 is being lowered, the magnetic attractive force acts on block member 80 only near the lowermost position, and block member 80 may be stably held at the lowermost position.

Figure 18:
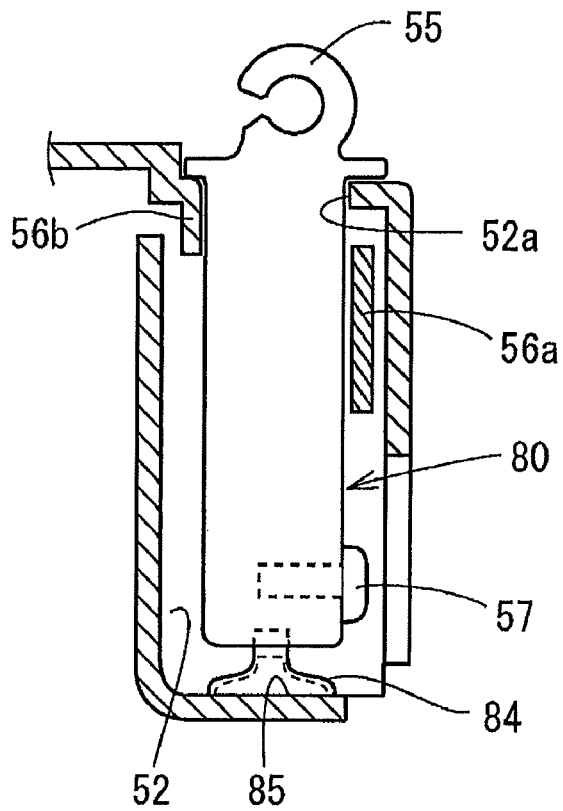
FIG. 18 is a cross sectional view of a brake unit according to another embodiment of the present invention.
Figure 19A:
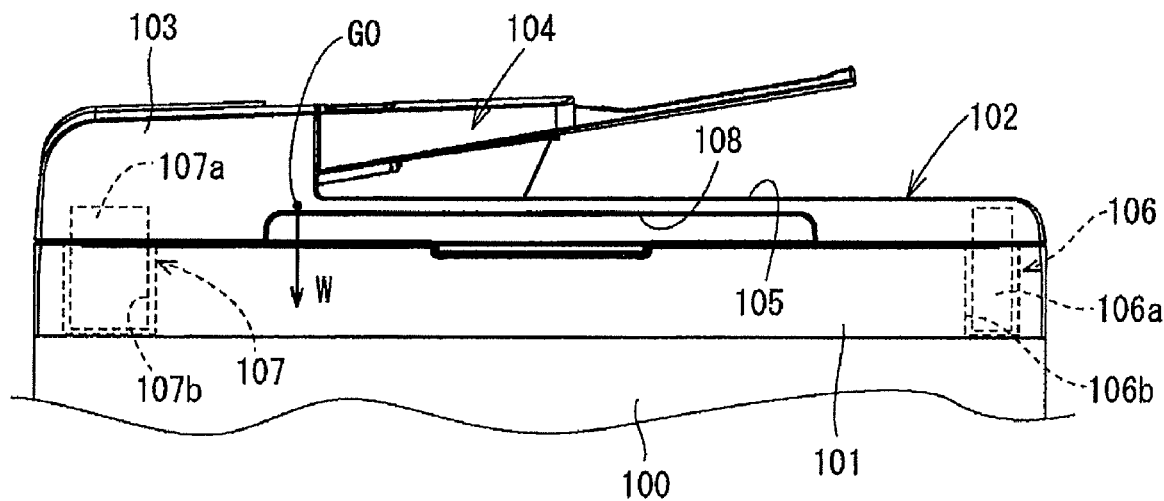
FIG. 19A is a front view of a known cover member with an auto document feeder in a closed position.
Figure 19B:
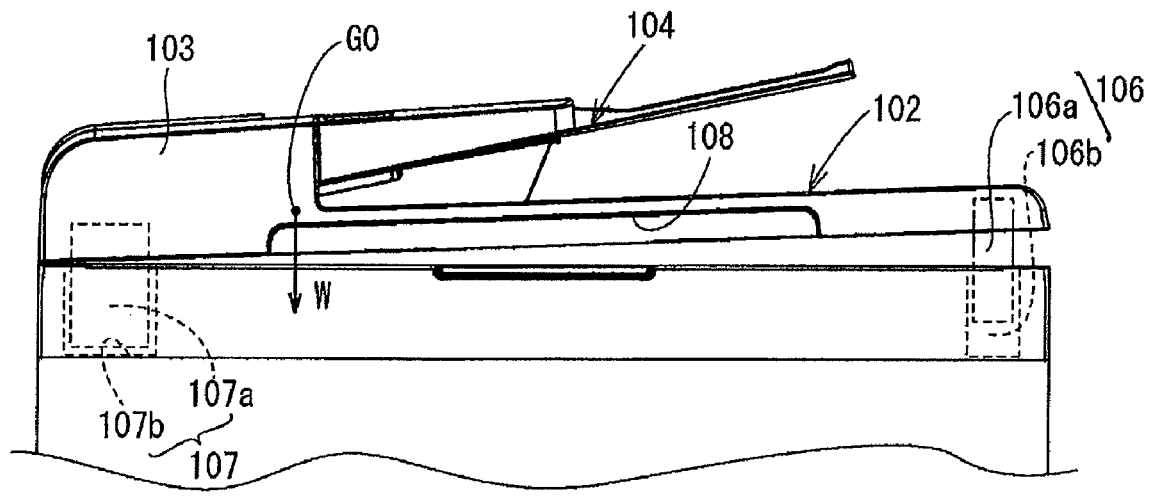
FIG. 19B is a front view of the known cover member of FIG. 19A illustrating the operations of opening the cover member.

Referring to FIG. 18, according to a seventh embodiment of the invention, a suction cup 84 and a flat portion 85 stickable to suction cup 84 may be provided in first hinge unit 16. Suction cup 84 may be disposed in one of block member 80 and storage unit 52. Flat portion 85 may be disposed in the other one of block member 80 and storage unit 52. In the embodiment illustrated in FIG. 18, the base portion of suction cup 84 may be attached to the lower surface of block member 80 by means of an adhesive or the like. A suction surface of suction cup 84 may be directed downward. Flat portion 85 stickable to the suction surface of suction cup 84 may be formed at the bottom of storage unit 52 facing the suction surface of suction cup 84. Block member 80 may not have a convex resistance portion or a recess. IN another embodiment, the position of suction cup 84 and the position of flat portion 85 may be interchanged.

The suction force of suction cup 84 may act as the braking force at the lowermost position of block member 80. The suction surface of suction cup 84 may stick to flat portion 85 to resist the upward movement of block member 80. When the suction force dissipates, block member 80 may easily move vertically. When block member 80 reaches the lowermost position, the suction force of suction cup 84 to flat portion 85 may be re-established, and block member 80 may be held at the lowermost position.

In FIG. 1, recess 65 of cover member 14 may be formed substantially in the middle image reading apparatus 10 in the Y direction. As denoted by the broken line in FIG. 1 and the two-dot chain lines in FIG. 3, a recess 65' may be disposed closer to auto document feeder 20 than recess 65. Recess 65' may be disposed closer to the center of gravity Go of the weight W of cover member 14 than recess 65 to facilitate smooth pivoting of cover member.

The braking force may vary depending on the inclination angle of resistance portion 61, the inclination angle of projection 60c, and a material and surface roughness thereof. The values and shapes that determines the braking force may be modified to according to the total weight W of cover member 14 and the position of the center of gravity Go.

While the invention has been described in connection with exemplary embodiments, it will be understood by those skilled in the art that other variations and modifications of the exemplary embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being indicated by the following claims.

What is claimed is:
1. A covering device comprising:
    a body;
    a cover member configured to selectively cover at least a portion of the body;
    a first hinge mechanism comprising:
        a first movable member, wherein the first movable member is pivotally coupled to the cover member and slidably attached to the body, and the first movable member is configured to move relative to the body in a predetermined direction; and
        a brake member configured to generate a brake force that applies resistance against the first movable member when a force is applied to move the first movable member relative to the body in the predetermined direction; and
    a second hinge mechanism comprising:
        a second movable member, wherein the second movable member is pivotally coupled to the cover member and slidably attached to the body, and the second movable member is configured to move relative to the body in the predetermined direction,
    wherein the first hinge mechanism is positioned further from a center of gravity of the cover member than the second hinge mechanism, and
    wherein the brake force generated by the brake member of the first hinge mechanism is greater than a frictional force generated by the second hinge mechanism when a force is applied to move the second movable member relative to the body in the predetermined direction.

2. The covering device according to claim 1, wherein the predetermined direction is a linear direction extending away from a surface of the body covered by the cover member.

3. The covering device according to claim 2, wherein the predetermined direction is orthogonal to the surface of the body covered by the cover member.

4. The covering device according to claim 1, wherein the brake member is coupled to the body.

5. The covering device according to claim 1, wherein the cover member further comprises:
- a first rotating shaft rotatably coupled to an end of the first movable member; and
- a second rotating shaft rotatably coupled to an end of the second movable member.

6. The covering device according to claim 1, wherein the brake member comprises:
- a leaf spring member; and
- a resistance portion, wherein the leaf spring member is configured to slide against the resistance portion when the first movable member moves.

7. The covering device according to claim 6, wherein the leaf spring member comprises a bendable projection, and the bendable projection slides against the resistance portion when the first movable member moves.

8. The covering device according to claim 6, wherein the resistance portion has a sloping surface against which the leaf spring member slides when the first movable member moves.

9. The covering device according to claim 1, wherein the brake member comprises:
- a magnet; and
- a metal portion, wherein the magnet generates an attraction force between the magnet and the metal portion to generate at least a portion of the brake force.

10. The covering device according to claim 1, wherein the brake member comprises:
- a suction cup; and
- a flat surface, wherein the suction cup generates a suction force between the suction cup and the flat surface to generate at least a portion of the brake force.

11. An image reading apparatus comprising the covering device according to claim 1, wherein the body further comprises:
- a light transmissive plate positioned at an upper surface of the body; and
- an image reading unit positioned below the light transmissive plate.

* * * * *